United States Patent
Artini (10) Patent No.: US 7,269,486 B2
(45) Date of Patent: Sep. 11, 2007

(54) METHOD AND DEVICE FOR AUTOMATICALLY DETERMINING A CAPTURE TRAJECTORY OF A FLIGHT TRAJECTORY FOR AN AIRCRAFT, AS WELL AS A PROCEDURE AND SYSTEM FOR AUTOMATIC GUIDANCE OF AN AIRCRAFT

(75) Inventor: Franck Artini, Toulouse (FR)

(73) Assignee: Airbus France, Toulouse (FR)

( * ) Notice: Subject to any disclaimer, the term of this patent is extended or adjusted under 35 U.S.C. 154(b) by 199 days.

(21) Appl. No.: 11/118,379

(22) Filed: May 2, 2005

(65) Prior Publication Data

US 2005/0261809 A1 Nov. 24, 2005

(30) Foreign Application Priority Data

May 18, 2004 (FR) .................................. 04 05374

(51) Int. Cl.
*G06F 9/00* (2006.01)
(52) U.S. Cl. ........................................... 701/3; 244/181
(58) Field of Classification Search .................... 701/1, 701/3, 14, 23, 6, 11, 12, 206, 210, 218, 226; 244/75.1, 76 R, 179, 181, 183, 184
See application file for complete search history.

(56) References Cited

U.S. PATENT DOCUMENTS

| | | | | |
|---|---|---|---|---|
| 4,692,869 A | * | 9/1987 | King et al. | 701/206 |
| 4,972,321 A | * | 11/1990 | Kahler | 701/16 |
| 5,922,031 A | * | 7/1999 | Larrieu | 701/3 |
| 6,269,301 B1 | * | 7/2001 | Deker | 701/206 |
| 6,349,258 B1 | | 2/2002 | Bonhoure et al. | |
| 2002/0193915 A1 | | 12/2002 | Miller | |
| 2003/0088360 A1 | | 5/2003 | Ikhlef et al. | |

FOREIGN PATENT DOCUMENTS

| | | |
|---|---|---|
| FR | 2749650 | 12/1997 |
| FR | 2787895 | 6/2000 |
| FR | 2803655 | 7/2001 |

OTHER PUBLICATIONS

Preliminary Search Report dated Dec. 29, 2004 with English translation.

* cited by examiner

*Primary Examiner*—Dalena Tran
(74) *Attorney, Agent, or Firm*—Stevens, Davis, Miller & Mosher, LLP (57) ABSTRACT

The present invention provides a method and device for automatically determining a capture trajectory of a flight trajectory for an aircraft, as well as a procedure and system for automatic guidance of an aircraft. The flight trajectory includes at least one lateral trajectory furnished at least with a plurality of rectilinear stretches. The capture trajectory is a lateral capture trajectory that allows the aircraft to join up laterally with a particular rectilinear stretch of the lateral trajectory of the flight trajectory. The capture trajectory is defined to allow a minimum capture duration. An automatic navigation mode is engaged as soon as requested by the pilot to, if necessary, capture and follow the planned flight trajectory.

26 Claims, 9 Drawing Sheets

METHOD AND DEVICE FOR AUTOMATICALLY DETERMINING A CAPTURE TRAJECTORY OF A FLIGHT TRAJECTORY FOR AN AIRCRAFT, AS WELL AS A PROCEDURE AND SYSTEM FOR AUTOMATIC GUIDANCE OF AN AIRCRAFT

FIELD OF THE INVENTION

The present invention relates to a method and a device for automatically determining a capture trajectory of a flight trajectory for an aircraft, as well as to a procedure and a system for automatic guidance of the aircraft using such a method and such a device respectively.

Although not exclusively, the present invention applies more particularly to a military transport plane which is generally very heavy, and whose maneuvering times are in general relatively slow.

BACKGROUND OF THE RELATED ART

When an aircraft comprises a planned flight trajectory (which has been planned in standard fashion in preparation for a mission), an automatic guidance mode consisting in making the aircraft follow this planned flight trajectory, in particular a navigation mode consisting more precisely in making the aircraft follow laterally a lateral trajectory of said planned flight trajectory, cannot be engaged in a managed mode, so long as the aircraft does not lie on said planned flight trajectory.

Also, when a pilot enables such an automatic guidance mode, in particular the aforesaid navigation mode, he must firstly guide the aircraft manually or according to a selected mode (that is to say by manually tuning particular parameters which are controlled on the aircraft) so as to allow him to join up with said planned flight trajectory, before said automatic guidance mode is engaged, this naturally requiring a significant work load of the pilot and giving rise to a delay in the engagement of the automatic guidance.

It will be noted that the fact of deviating from a planned flight trajectory is relatively frequent during a low altitude flight carried out in the military context, for example by a military transport plane, and generally depends on the operational conditions encountered and in particular on the search during the flight for the most effective possible terrain masking.

SUMMARY OF THE INVENTION

The present invention is aimed at remedying these drawbacks. It relates to a method for automatically determining a capture trajectory of a flight trajectory for an aircraft, said flight trajectory comprising at least one lateral trajectory furnished at least with a plurality of rectilinear stretches.

Accordingly, said method is noteworthy, according to the invention, in that said capture trajectory is a lateral capture trajectory which is formed in such a way as to allow the aircraft to join up laterally with a particular rectilinear stretch (of the lateral trajectory of said flight trajectory), and which comprises, successively:

- an initial phase representing a circular arc rotation and starting at the current position of the aircraft;
- a transition phase comprising a rectilinear segment exhibiting an angle of capture with respect to said particular rectilinear stretch, if first conditions are satisfied; and
- a terminal capture phase representing a rotation allowing the aircraft to join up with said particular rectilinear stretch with a predetermined course.

Moreover, according to the invention said capture trajectory is defined in such a way as to allow a minimum capture duration, that is to say a minimum flight duration for joining up laterally with the flight trajectory, in particular a flight trajectory planned during mission preparation.

By virtue of the invention, the rotations implemented during the initial and terminal phases therefore also exhibit a minimum duration, this naturally being advantageous for the comfort of the crew and the passengers.

Advantageously, the radius of the circular arc forming said initial phase is determined on the basis of a maximum allowable load factor and of a preset speed of the aircraft.

Furthermore, advantageously, the direction which makes it possible to minimize the duration of the capture phase (that is to say of the phase for joining up with said lateral trajectory) is determined as direction of rotation of the initial phase.

In a preferred embodiment, said direction of rotation depends:

- on a distance d representing the maximum distance during the initial phase with respect to said particular rectilinear stretch;
- on the radius R of the circular arc forming said initial phase;
- on an error of course TKAE between the current course of the aircraft and that making it possible to follow said particular rectilinear stretch;
- on the side, with respect to the lateral trajectory of the flight trajectory, on which the aircraft is flying, when looking in the direction of flight defined to follow said lateral trajectory.

In this case, advantageously, said direction of rotation corresponds:

A/ when $d \geq 2R$:
  a) when the aircraft is flying on the right side:
    1) TKAE $\in ]-180°; -(180°-\alpha)[$, to a rightward rotation;
    2) TKAE $\in [-180°-\alpha); \alpha[$, to a leftward rotation;
    3) TKAE=$\alpha$, to no rotation; and
    4) TKAE $\in ]\alpha; 180°]$, to a rightward rotation;
    $\alpha$ representing said angle of capture;
  b) when the aircraft is flying on the left side:
    1) TKAE $\in ]-180°; -\alpha[$, to a leftward rotation;
    2) TKAE=$-\alpha$, to no rotation;
    3) TKAE $\in ]-\alpha; 180°-\alpha]$, to a rightward rotation; and
    4) TKAE $\in [180°-\alpha; 180°]$, to a leftward rotation;

B/ when $dmin \leq d < 2R$, with $dmin=2R \cos \alpha$:
  a) when the aircraft is flying on the right side:
    1) TKAE $\in ]-180°; -(180°-(\alpha-\beta))]$, to a rightward rotation;
    2) TKAE $\in ]-(180°-(\alpha-\beta)); 0°]$, to a leftward rotation;
    3) TKAE $\in [0°; 180°-(\alpha-\beta)]$, to a leftward rotation;
    4) TKAE $\in ]180°-(\alpha-\beta); 180°]$, to a rightward rotation; and
    5) TKAE=$-(\alpha-\beta)$, to no rotation;
    $\beta$ representing a particular angle;
  b) when the aircraft is flying on the left side:
    1) TKAE $\in ]-180°; -(\alpha-\beta)[$, to a leftward rotation;
    2) TKAE=$-(\alpha-\beta)$, to no rotation;
    3) TKAE $\in ]-(\alpha-\beta); 0°]$, to a rightward rotation;
    4) TKAE $\in [0°; 180°-(\alpha-\beta)]$, to a rightward rotation; and
    5) TKAE $\in ]180°-(\alpha-\beta); 180°]$, to a leftward rotation;

C/ when $d<dmin$ and the aircraft is flying on the right side or on the left side:

1) TKAE ∈[0°; 180°], to a rightward rotation; and
2) TKAE ∈]−180°; 0°], to a leftward rotation.

Additionally, advantageously, said angle of capture exhibits a predetermined value, which is modifiable by an operator. It is known that the comfort of capture increases (but its effectiveness drops), when the value of the angle of capture decreases. The operator must therefore find a compromise between comfort and effectiveness, which is in particular tailored to the mission to be carried out.

Furthermore, advantageously, said first conditions are satisfied so that said transition phase then comprises a rectilinear segment, when the distance d (representing the maximum distance during the initial phase with respect to said particular rectilinear stretch), satisfies one of the following relations:

a) d≧2R, R being the radius of the circular arc forming said initial phase;
b) d≦dmin, with dmin=2R cos α, α representing said angle of capture.

Furthermore, advantageously, if said first conditions are not satisfied, said transition phase simply corresponds to a point of joining of said initial and terminal phases.

Additionally, said predetermined course used to determine said terminal capture phase corresponds to the course making it possible to follow said particular rectilinear stretch of the lateral trajectory.

Furthermore, advantageously, the terminal capture phase represents a circular arc rotation, whose radius is determined on the basis of a maximum allowable load factor and of a preset speed of the aircraft, as the radius of the circular arc forming the initial phase.

The present invention also relates to a device for automatically determining a capture trajectory of a flight trajectory for an aircraft, said flight trajectory comprising at least one lateral trajectory furnished at least with a plurality of rectilinear stretches.

According to the invention, said device is noteworthy in that it comprises means for forming said capture trajectory in such a way as to obtain a trajectory which allows the aircraft to join up laterally with a particular rectilinear stretch of said flight trajectory, and which comprises, successively:
- an initial phase at the current position of the aircraft;
- a transition phase comprising a rectilinear segment exhibiting an angle of capture with respect to said particular rectilinear stretch, if first conditions are satisfied; and
- a terminal capture phase representing a rotation allowing the aircraft to join up with said particular rectilinear stretch with a predetermined course.

The present invention also relates to a procedure for guiding an aircraft which comprises a planned flight trajectory comprising at least one lateral trajectory furnished at least with a plurality of rectilinear stretches.

According to the invention, said guidance procedure is noteworthy in that:
a) during a flight of the aircraft, when the aircraft is not guided along said planned flight trajectory, permanently:
   a1) a method such as that mentioned above is implemented to automatically determine a capture trajectory allowing the aircraft to join up laterally with a particular rectilinear stretch of the lateral trajectory of said planned flight trajectory; and
   a2) said capture trajectory is presented to a pilot of the aircraft;
b) when a pilot of the aircraft (A) enables a navigation mode intended to automatically guide the aircraft laterally along said planned flight trajectory:
   b1) if the aircraft does not lie on said planned flight trajectory, the aircraft is guided automatically laterally along said capture trajectory so as to capture said planned flight trajectory; and
   b2) as soon as the aircraft lies on said planned flight trajectory, it is guided automatically with the aid of said navigation mode laterally along said planned flight trajectory.

In a particular embodiment, in step b1), the aircraft does not lie on the planned flight trajectory, when the lateral distance between the current position of the aircraft and the lateral trajectory of the flight trajectory is greater than a predetermined distance (relating to the engagement of the navigation mode).

The present invention additionally relates to a system for guiding an aircraft, comprising a means of guidance able to implement a standard navigation mode intended to automatically guide the aircraft laterally along a planned flight trajectory.

This guidance system is noteworthy, according to the invention:
in that it furthermore comprises:
   a device such as that mentioned above, for automatically determining a capture trajectory allowing as appropriate the aircraft to join up laterally with a particular rectilinear stretch of the lateral trajectory of said planned flight trajectory; and
   means for presenting said capture trajectory to a pilot of the aircraft; and
said guidance means is formed in such a way as to automatically guide the aircraft, as soon as it is enabled:
   laterally along said capture trajectory so as to capture said planned flight trajectory, if the aircraft does not lie on said planned flight trajectory; and
   laterally along said planned flight trajectory with the aid of said navigation mode, as soon as said aircraft lies on said planned flight trajectory.

Thus, by virtue of the invention, an automatic navigation mode is engaged immediately as soon as the pilot requests it (by enabling this navigation mode) in such a way as to, if necessary, capture and to follow laterally the planned flight trajectory. This engagement is therefore immediate, even if the aircraft is not flying along the (or toward) said planned flight trajectory, and this is so regardless of the position and the trajectory of said aircraft.

BRIEF DESCRIPTION OF THE DRAWINGS

The figures of the appended drawing will elucidate the manner in which the invention may be embodied. In these figures, identical references designate similar elements.

DETAILED DESCRIPTION OF THE DRAWINGS

Figure 1:
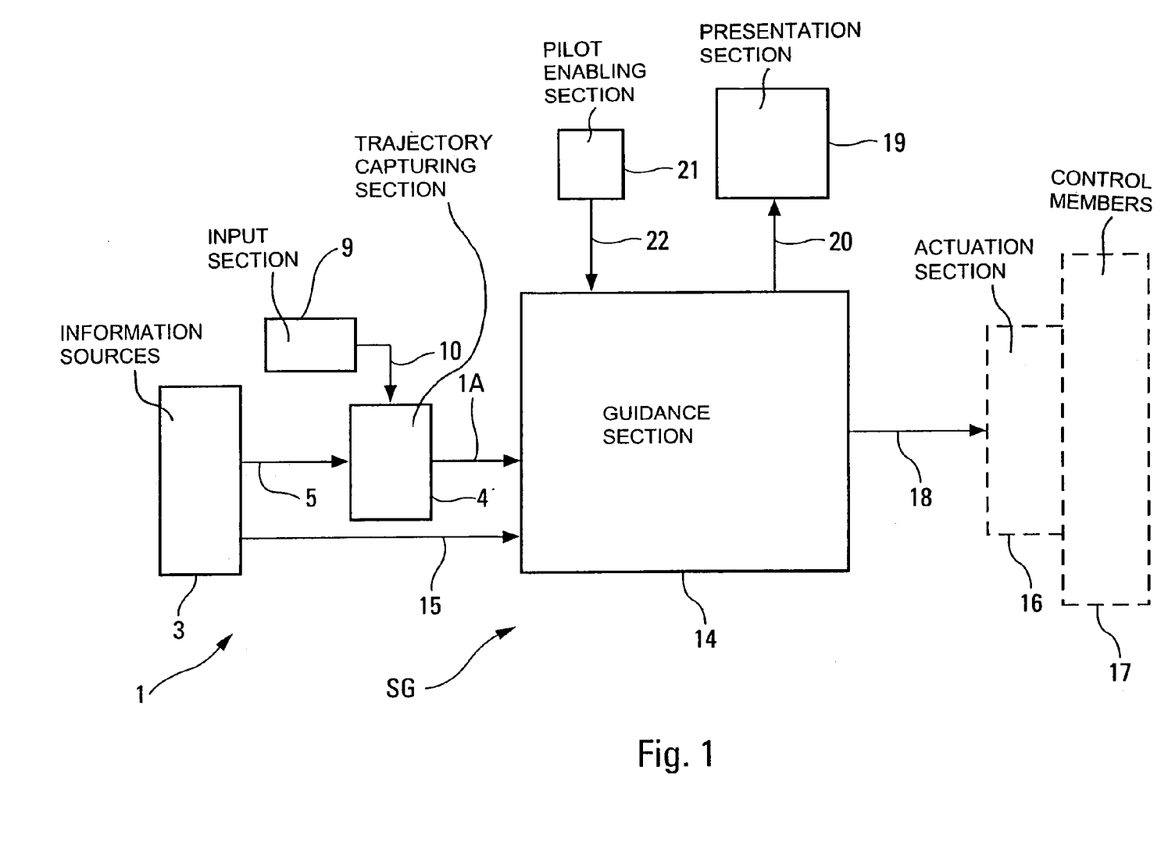
FIG. 1 is the schematic diagram of a guidance system according to the invention, comprising in particular a device in accordance with the invention.
Figures 2, 3:
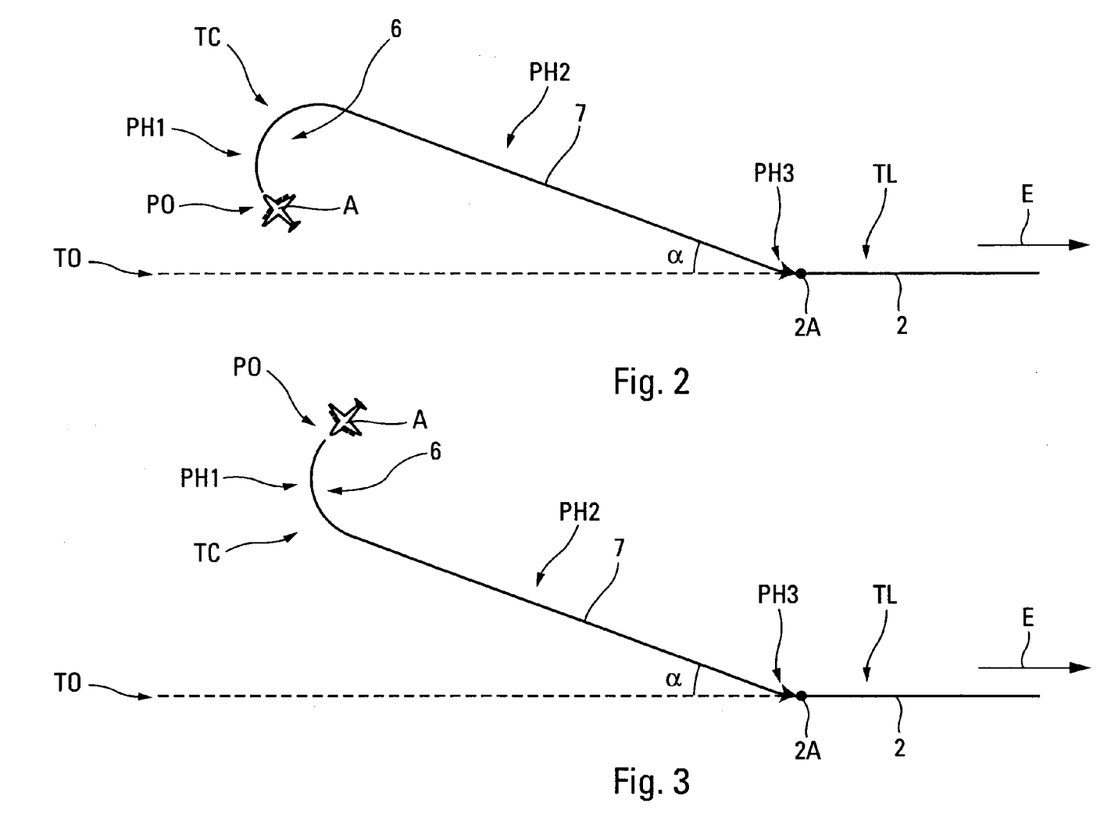
FIGS. 2 and 3 illustrate two types of capture of a flight trajectory.

The device 1 in accordance with the invention and represented diagrammatically in FIG. 1 is intended to automatically determine a capture trajectory TC allowing an aircraft A, in particular a military transport plane, to capture a flight trajectory TO, as represented in FIGS. 2 and 3, said flight trajectory TO comprising at least one lateral trajectory TL furnished with at least a plurality of rectilinear stretches 2.

In a particular embodiment, said flight trajectory TO is a so-called "string-like" trajectory which consists of rectilinear stretches 2, whose lateral and vertical transitions are circular arcs of constant radius which stem from considerations of preset speed and of maximum allowable load factors. The lateral transitions lie at the level of waypoints which generally stem from a flight plan. This flight trajectory TO is an anticipated trajectory, determined with the aid of predicted climb and descent performance of the aircraft A and therefore comprises a lateral trajectory TL in the horizontal plane and a vertical trajectory TV (or flight profile) in the vertical plane.

In a preferred but nonlimiting embodiment, said flight trajectory TO is a low altitude trajectory which allows the aircraft A to follow as closely as possible the terrain overflown, in particular to avoid being pinpointed. This flight trajectory TO is computed by standard computing means, with the aid of a digital database of the terrain or of a radar map, and hugs, as closely as possible, the configuration of the terrain overflown.

To do this, said device 1 can comprises a set 3 of information sources, which comprises in particular the aforesaid standard computing means, to determine the flight trajectory TO.

According to the invention, said device 1 furthermore comprises means 4 which are connected by a link 5 to said set 3, so as to form said capture trajectory TC which must make it possible to join up (that is to say to capture) laterally with a particular rectilinear stretch 2 of the lateral trajectory TL of said flight trajectory TO, received from said set 3 of information sources.

Furthermore, according to the invention, said means 4 determine a capture trajectory TC which is defined in such a way that a minimum capture duration is necessary for the aircraft A and which comprises, successively, as represented for example in FIGS. 2 and 3:

an initial phase PH1 representing a circular arc rotation 6 and starting at the current position PO of the aircraft A;

a transition phase PH2 comprising, if particular conditions mentioned below are satisfied, a rectilinear segment 7 exhibiting an angle of capture α with respect to said particular rectilinear stretch 2 to be joined up with; and a terminal capture phase PH3 representing a rotation allowing the aircraft A to join up (at a point 2A) with said particular rectilinear stretch 2 with a predetermined course, namely the course TRK2 making it possible to follow said rectilinear stretch 2 of the lateral trajectory TL in the direction of flight E, such as defined from the flight plan.

Said capture trajectory TC therefore allows the aircraft A to join up laterally with the lateral trajectory TL of the flight trajectory TO which is, in particular, a flight trajectory planned during mission preparation.

Moreover, by virtue of the invention, the rotations implemented during the initial and terminal phases PH1 and PH3, which are complex maneuvers, difficult to implement and generally uncomfortable, exhibit a minimum duration, thereby making it possible to limit the reduction in the comfort of the crew and of the passengers and to return rapidly to a less disturbing flight.

Said means 4 determine the radius R of the circular arc 6 forming said initial phase PH1, on the basis of a maximum allowable load factor and of a preset speed of the aircraft A.

Figure 4:
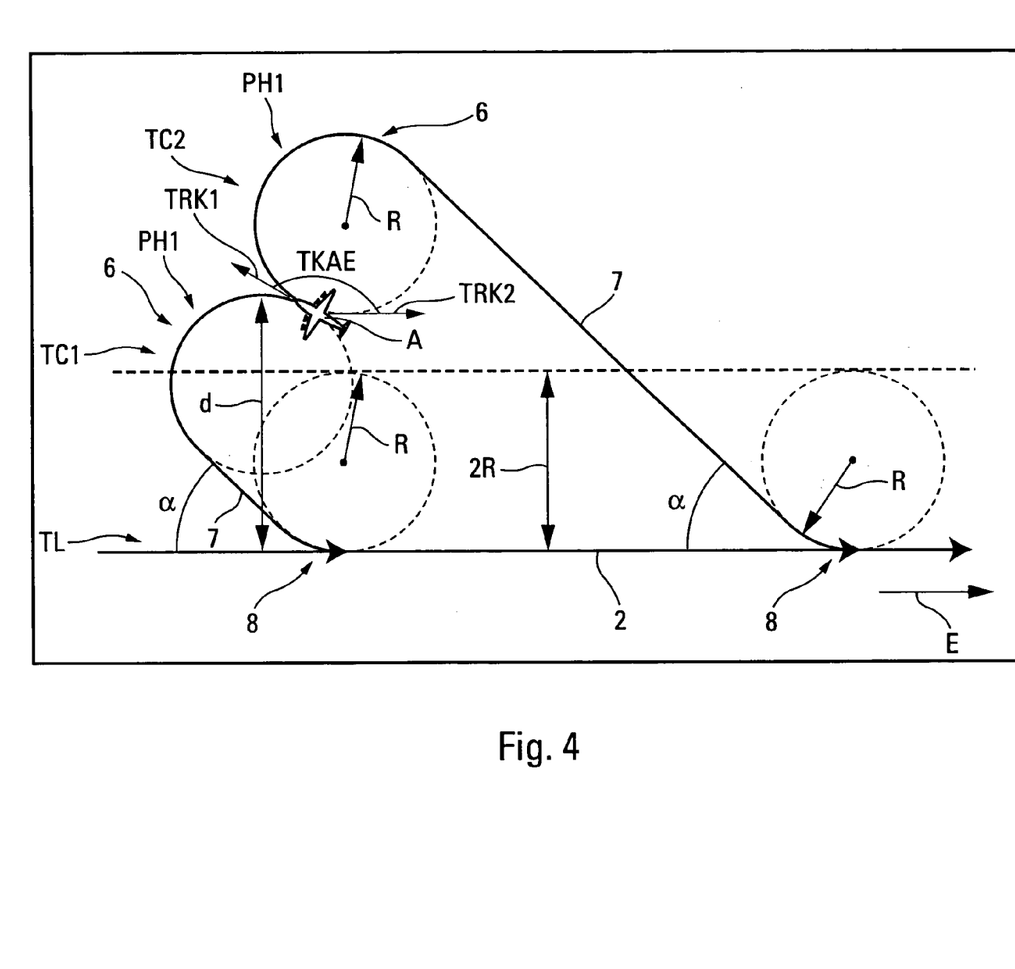
FIGS. 4 to 11 are graphics which provide a clear explanation of the essential characteristics of the present invention.

The same goes for the radius R of the circular arc 8 forming the terminal capture phase PH3 and represented in FIG. 4.

Furthermore, the angle of capture α between the rectilinear segment 7 of the transition phase PH2 and the particular rectilinear stretch 2 to be joined up with, which forms part of the domain]0°; 90°[, may be tuned during the preparation of the mission by a member of the crew of the aircraft A, with the aid of a means of input 9 which is connected to said means 4 via a link 10. Preferably, said angle of capture α is initialized with a default value, for example 30°.

From its current (initial) position PO, the aircraft A can turn to the right, as represented in FIG. 2, or to the left, as represented in FIG. 3, to commence the initial phase PH1. According to the invention, said means 4 determine, as direction of rotation of this initial phase PH1, the direction (rightward, leftward) which makes it possible to minimize the duration of the capture phase.

More precisely, said direction of rotation depends:

on a distance d representing the maximum (orthogonal) distance during the initial phase PH1 with respect to said particular rectilinear stretch 2, as represented for the capture trajectory TC1 in FIG. 4. The distance d therefore represents the maximum value of a distance (orthogonal) XTK between the aircraft A and the particular rectilinear segment 2. FIG. 4 shows two capture trajectories TC1 and TC2 respectively comprising initial phases PH1 of rotation to the left and to the right.

on the radius R of the circular arc 6 forming said initial phase PH1;

on an error of course TKAE between the current course TRK1 of the aircraft A and the course TRK2 making it possible for the aircraft A to follow said particular rectilinear stretch 2 in the direction of flight E; and on the side (right or left), with respect to the lateral trajectory TL of the flight trajectory TO, on which the aircraft A is flying, when looking in the direction of flight E defined by the flight plan to follow said lateral trajectory TL. In the example of FIG. 4, the aircraft 4 is therefore flying on the left side.

According to the invention, said direction of rotation corresponds:

A/ when $d \geq 2R$:

a) when the aircraft A is flying on the right side:
1) TKAE $\in$ ]$-180°$; $-(180°-\alpha)$[, to a rightward rotation;
2) TKAE $\in$ [$-180°-\alpha$); $\alpha$[, to a leftward rotation;
3) TKAE=$\alpha$, to no rotation; and
4) TKAE $\in$ ]$\alpha$; $180°$], to a rightward rotation;
α representing said angle of capture;

b) when the aircraft A is flying on the left side:
1) TKAE $\in$ ]$-180°$; $-\alpha$[, to a leftward rotation;
2) TKAE=$-\alpha$, to no rotation;
3) TKAE $\in$ ]$-\alpha$; $180°-\alpha$], to a rightward rotation; and
4) TKAE $\in$ [$180°-\alpha$; $180°$], to a leftward rotation;

B/ when $dmin \leq d$'$2R$, with $dmin=2R \cos \alpha$:

a) when the aircraft A is flying on the right side:
1) TKAE $\in$ ]$-180°$; $-(180°-(\alpha-\beta))$], to a rightward rotation;
2) TKAE $\in$ ]$-(180°-(\alpha-\beta))$; $0°$], to a leftward rotation;
3) TKAE $\in$ ($0°$; $180°-(\alpha-\beta)$], to a leftward rotation;
4) TKAE $\in$ ] $180°-(\alpha-\beta)$; $180°$], to a rightward rotation; and
5) TKAE=$-(\alpha-\beta)$, to no rotation;
β representing a particular angle;

b) when the aircraft A is flying on the left side:
1) TKAE $\in$ ]$-180°$; $-(\alpha-\beta)$[, to a leftward rotation;
2) TKAE=$-(\alpha-\beta)$, to no rotation;
3) TKAE $\in$ ]$-(\alpha-\beta)$; $0°$], to a rightward rotation;

4) TKAE $\epsilon[0°; 180°-(\alpha-\beta)]$, to a rightward rotation; and

5) TKAE $\epsilon]180°-(\alpha-\beta); 180°]$, to a leftward rotation;

C/ when d<dmin and the aircraft A is flying on the right side or on the left side:

1) TKAE $\epsilon[0°; 180°]$, to a rightward rotation; and

2) TKAE $\epsilon]-180°; 0°]$, to a leftward rotation.

Figure 5:
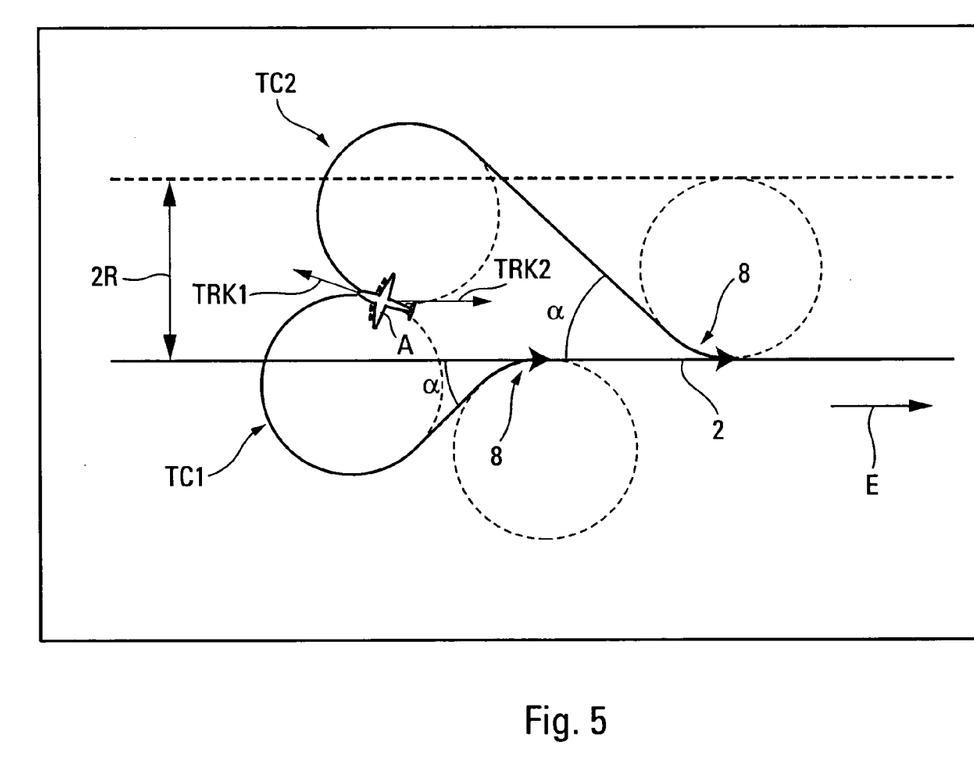
Figure 6:
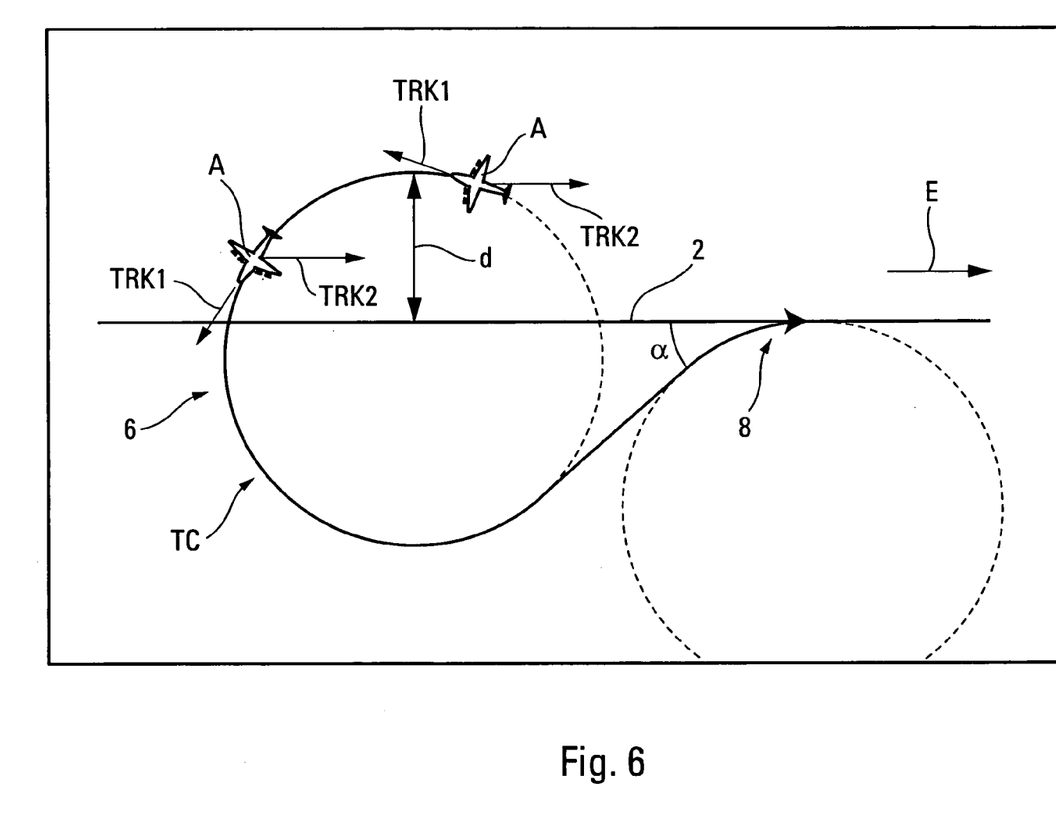

Additionally, it will be noted that:

if d>2R, the aircraft A remains on the same side of the rectilinear stretch 2 for the whole capture trajectory TC, and a rectilinear segment 7 may be inserted between the initial phase PH1 and the terminal phase PH2;

if d=2R, the capture trajectory TC is reduced to a circular arc of radius R; and if $0 \leq d<2R$ (FIG. 5), then a capture trajectory TC2 remains on the same side of the rectilinear stretch 2, while the other capture trajectory TC1 crosses this rectilinear stretch 2 and the capture of said rectilinear stretch 2 is then carried out from the other side, as also represented in FIG. 6.

It will furthermore be noted that the distance d is connected with the course error TKAE and with the aforesaid distance XTK through the following relation:

$$d = XTK + R(1 + \cos TKAE)$$

this being regardless of the sign of the angle TKAE.

Figure 7:
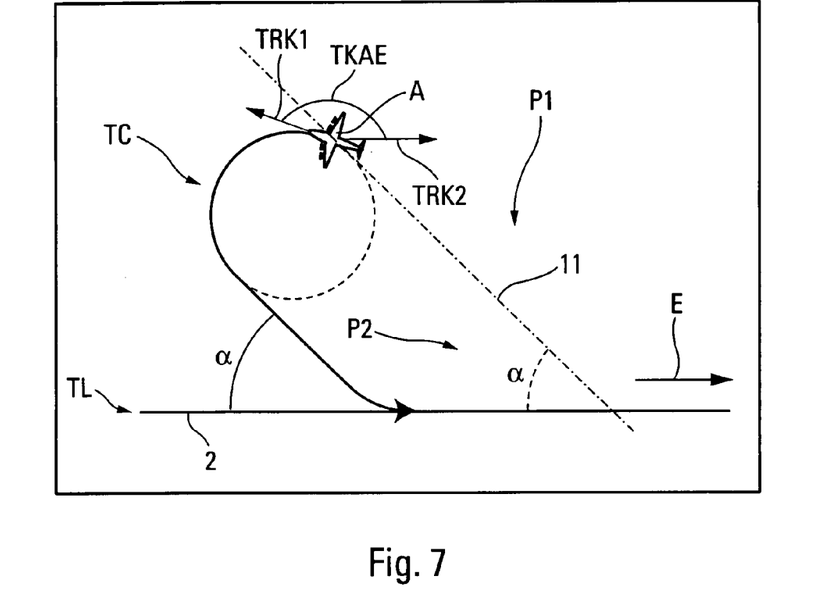
Figure 8:
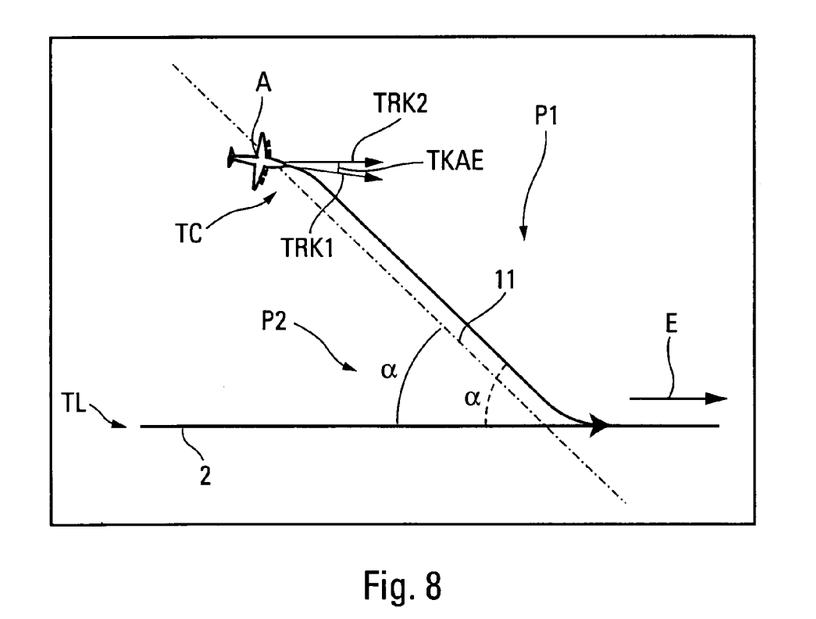

For simplicity, the direction of rotation of the initial phase PH1 corresponds:

A/ when $d \geq 2R$;
  a) when the aircraft A is flying on the right side:
    1) if TKAE is in a half-plane P1 (which lies in front of a line of separation 11 represented in FIGS. 7 and 8 and defined by an angle corresponding to A-TRK, TRK representing the course), to a leftward rotation;
    2) if TKAE is in a half-plane P2 (which lies to the rear of said line of separation 11), to a rightward rotation;
  b) when the aircraft A is flying on the left side:
    1) if TKAE is in the front half-plane P1, to a rightward rotation (FIG. 8);
    2) if TKAE is in the rear half-plane P2, to a leftward rotation (FIG. 7);

B/ when $dmin \leq d \leq 2R$:
  a) when the aircraft A is flying on the right side:
    1) if TKAE is in a front half-plane defined by $\alpha-\beta$-TRK, to a leftward rotation;
    2) if TKAE is in a rear half-plane defined by $\alpha-\beta$-TRK, to an initial rightward rotation;
  b) when the aircraft A is flying on the left side:
    1) if TKAE is in a front half-plane defined by $\alpha-\beta$-TRK, to a rightward rotation;
    2) if TKAE is in a rear half-plane defined by $\alpha-\beta$-TRK, to a leftward rotation;

C/ when d<dmin and the aircraft A is flying on the right side or on the left side:
  1) if TKAE is in a left half-plane defined by the desired course, to a rightward rotation;
  2) if TKAE is in a right half-plane defined by the desired course, to a leftward rotation.

Upon the capture request issued by the pilot (which corresponds to the enabling of the guidance mode), the important thing is therefore to properly determine the direction of the first turn, this fixing the total duration of turn of the capture maneuver. More precisely, out of the two possible directions, one chooses that which gives rise to the smaller duration.

Figure 9:
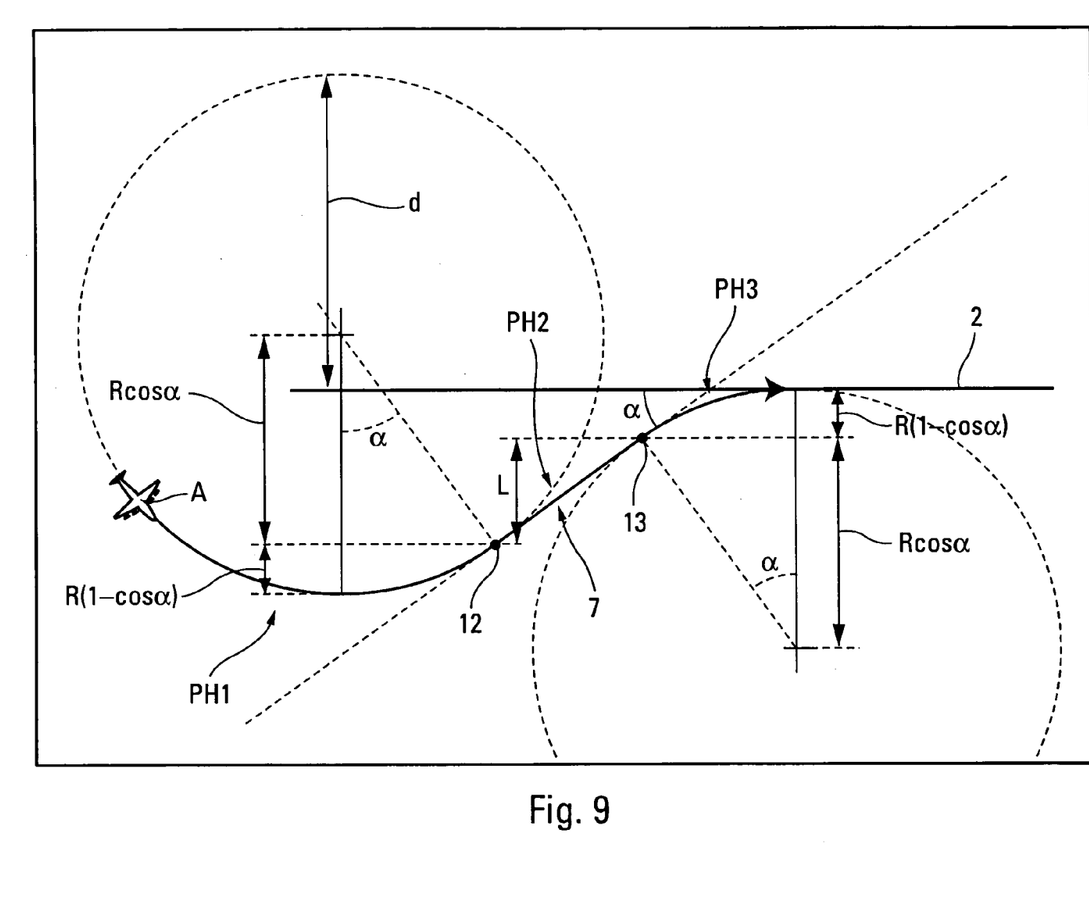

Represented in FIG. 9 are the various parameters used for the implementation of the present invention. A rectilinear segment 7 may be inserted between the initial phase PH1 and the terminal phase PH3, between two points 12 and 13 of joining respectively of the phases PH1 and PH2 and of the phases PH2 and PH3, if a length L is greater than 0.

This length L satisfies the relation:

$$L \sin \alpha = 2R \cos \alpha - d,$$

thereby making it possible to define the criterion dmin=2R cos $\alpha$.

Thus, within the framework of the present invention, the aforesaid particular conditions are satisfied (so that the transition phase PH2 comprises a rectilinear segment 7), when the distance d satisfies one of the following relations:

a) $d \geq 2R$, R being the radius of the circular arc 6 forming said initial phase PH1;

b) $d \leq dmin$.

Figure 10:
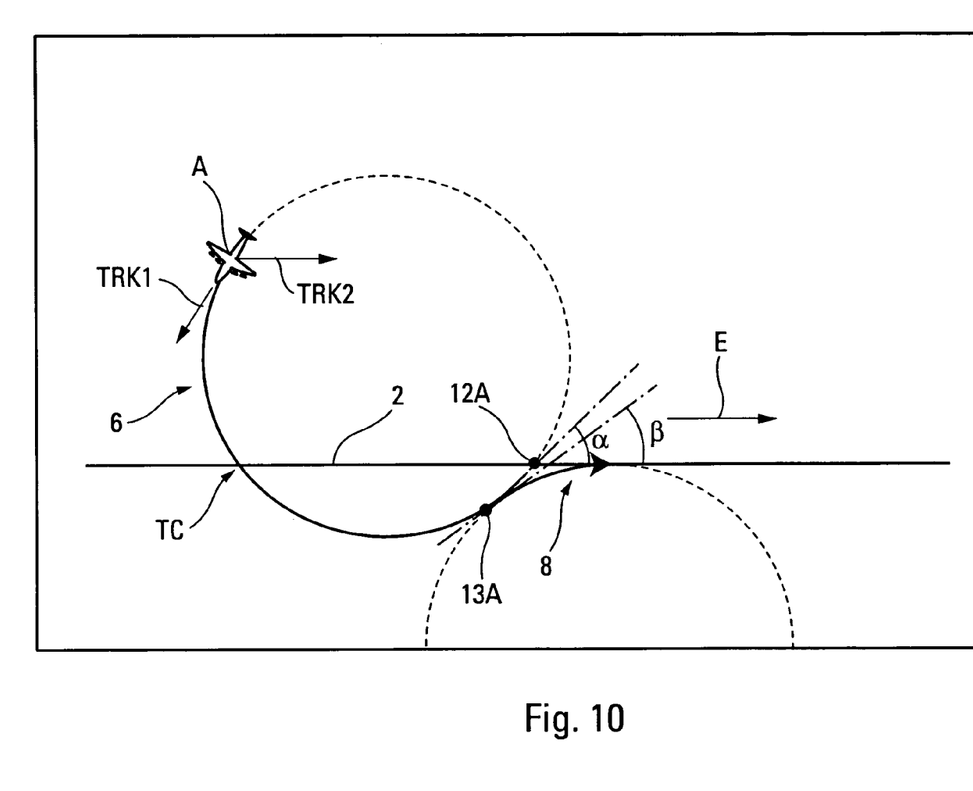

If these particular conditions are not satisfied, that is to say if dmin<d<2R, no rectilinear segment is inserted between the initial phase PH1 and terminal phase PH3 and the transition phase 2 corresponds to a simple point of joining 13A of said initial and terminal phases PH1 and PH3, as is represented in FIG. 10. Points 12A and 13A of FIG. 10 correspond to points 12 and 13 of FIG. 9. This FIG. 10 moreover presents the angle $\beta$ which corresponds to the angle of the point of inflection of the tangent relating to the two circles (that are tangential at 13A).

Figure 11:
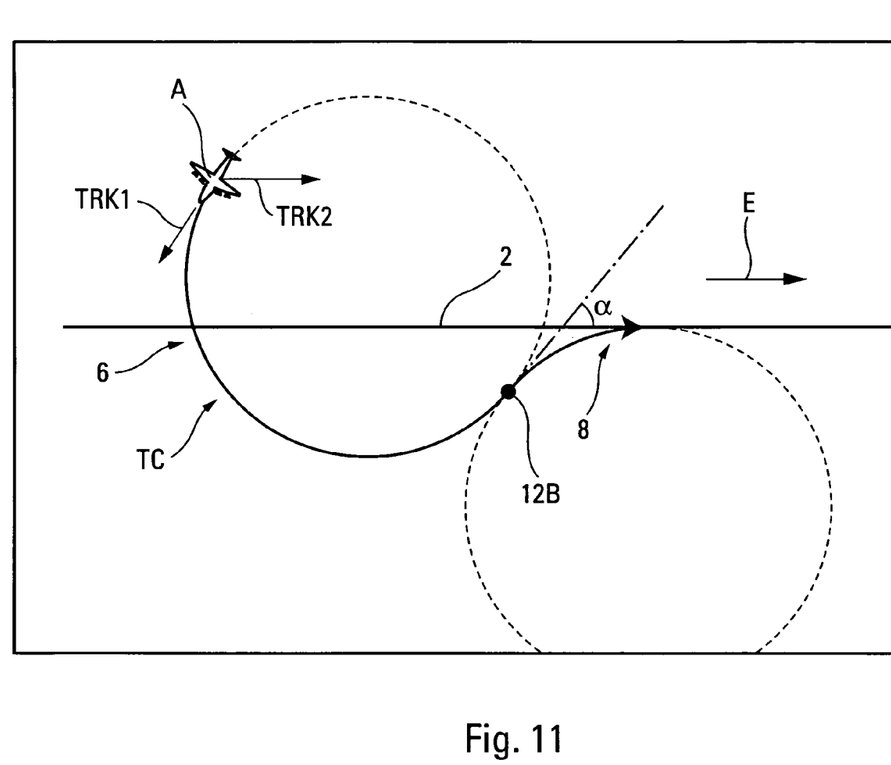

When d=dmin, the two circles are tangential at a point 12B which corresponds simply to the grouping of the points 12 and 13 of FIG. 9, as is represented in FIG. 11.

In a preferred application of the present invention, the device 1 for automatically determining a capture trajectory TC of the flight trajectory TO is integrated into an automatic guidance system SG, as represented in FIG. 1.

In a standard fashion, said guidance system SG which is intended to automatically guide the aircraft A laterally along a planned flight trajectory TO comprises:

a standard means of guidance 14, for example an automatic pilot, which receives information from the set 3 of information sources by way of a link 15 and which is intended to determine orders for steering the aircraft A so that it follows (at least laterally) said flight trajectory TO. To do this, said guidance means 14 is able to implement a standard mode of navigation, intended to automatically guide the aircraft A laterally along said planned flight trajectory TO; and means of actuation 16 of controlled members 17 such as for example control surfaces (rudder, elevators, etc.) of the aircraft A, which means of actuation 16 are connected by a link 18 to said guidance means 14 and to which the steering orders determined by the latter are applied, said means of actuation 16 and said control members 17 being represented dashed in FIG. 1.

According to the invention, said guidance system SG moreover comprises:

said device 1 which is connected by a link 1A to said guidance means 14, for automatically determining a capture trajectory TC allowing the aircraft A to join up laterally with a particular rectilinear stretch 2 of the lateral trajectory TL of the planned flight trajectory TO; and standard means 19 which are for example connected by a link 20 to the guidance means 14, for presenting said capture trajectory TC to a pilot of the aircraft A, for example on a display screen (not represented).

Moreover, said guidance means 14 is formed in such a way as to guide the aircraft A automatically, as soon as it is enabled by a pilot with the aid of a standard means 21 which is, for example, connected by way of a link 22 to said guidance means 14. This automatic guidance consists:

in guiding the aircraft A laterally along said capture trajectory TC so as to capture said planned flight trajectory TO, if the aircraft A does not lie in said planned flight trajectory TO; and in guiding the aircraft A laterally along said planned flight trajectory TO with the aid of said aforementioned navigation mode, as soon as said aircraft A lies on said planned flight trajectory TO.

It will be noted that the aircraft A does not lie on said planned flight trajectory TO, when the lateral distance between the current position PO of the aircraft A and the lateral trajectory TL of the flight trajectory TO is greater than a predetermined distance.

Thus, by virtue of the invention, the navigation mode (automatic lateral guidance) implemented by the guidance means 14 is engaged immediately as soon as the pilot requests it (by enabling this navigation mode with the aid of the means 21). This engagement is immediate, even if the aircraft A is not flying along the planned flight trajectory TO (in this case, the device 1 in fact firstly guides the aircraft A in an automatic manner laterally along the capture trajectory TC which corresponds to a predetermined trajectory, thereby allowing the engagement of the guidance mode), and this being so regardless of the position PO and the trajectory of said aircraft A.

The invention claimed is:

1. A method for automatically determining a capture trajectory of a flight trajectory for an aircraft, said flight trajectory comprising at least one lateral trajectory furnished at least with a plurality of rectilinear stretches, said capture trajectory comprising successively an initial phase representing a circular arc rotation, a transition phase and a terminal capture phase representing a rotation, wherein:

said capture trajectory is a lateral capture trajectory which is formed in such a way as to allow the aircraft to join up laterally with a particular rectilinear stretch of the lateral trajectory of said flight trajectory, and of which:

the initial phase starts at the current position of the aircraft and exhibits a direction of rotation which makes it possible to minimize the duration of the capture phase, said direction of rotation depending:

on a distance d representing the maximum distance during the initial phase with respect to said particular rectilinear stretch;

on the radius R of the circular arc forming said initial phase;

on an error of course, TKAE, between the current course of the aircraft and a course making it possible to follow said particular rectilinear stretch; and on the side, with respect to the lateral trajectory of the flight trajectory, on which the aircraft is flying, when looking in the direction of flight defined to follow said lateral trajectory;

the transition phase comprises a rectilinear segment exhibiting an angle of capture with respect to said particular rectilinear stretch, if first conditions are satisfied; and the terminal capture phase represents a rotation allowing the aircraft to join up with said particular rectilinear stretch with a predetermined course, and said direction of rotation corresponds:

A/ when $d \geq 2R$:
  a) when the aircraft is flying on the right side:
    1) TKAE $\in ]-180°; -(180°-\alpha) [$, to a rightward rotation;
    2) TKAE $\in [-180°-\alpha); \alpha[$, to a leftward rotation;
    3) TKAE$=\alpha$, to no rotation; and
    4) TKAE $\in ]\alpha; 180°]$, to a rightward rotation;
    $\alpha$ representing said angle of capture;
  b) when the aircraft is flying on the left side:
    1) TKAE $\in ]-180°; -\alpha[$, to a leftward rotation;
    2) TKAE$=-\alpha$, to no rotation;
    3) TKAE $\in ]-\alpha; 180°-\alpha]$, to a rightward rotation; and
    4) TKAE $\in [180-\alpha; 180°]$, to a leftward rotation;

B/ when $dmin \leq d < 2R$, with $dmin=2R \cos \alpha$:
  a) when the aircraft is flying on the right side:
    1) TKAE $\in ]-180°; -(180°-(\alpha-\beta))]$, to a rightward rotation;
    2) TKAE $\in ]-(180°-(\alpha-\beta)); 0°]$, to a leftward rotation;
    3) TKAE $\in [0°; 180°-(\alpha-\beta)]$, to a leftward rotation;
    4) TKAE $\in ]180°-(\alpha-\beta); 180°]$, to a rightward rotation; and
    5) TKAE$=-(\alpha-\beta)$, to no rotation;
    $\beta$ representing a particular angle;
  b) when the aircraft is flying on the left side:
    1) TKAE $\in ]-180°; -(\alpha-\beta) [$, to a leftward rotation;
    2) TKAE$=-(\alpha-\beta)$, to no rotation;
    3) TKAE $\in ]-(\alpha-\beta); 0°]$, to a rightward rotation;
    4) TKAE $\in [0°; 180°-(\alpha-\beta)]$, to a rightward rotation; and
    5) TKAE $\in ]180°-(\alpha-\beta); 180°]$, to a leftward rotation;

C/ when $d<dmin$ and the aircraft is flying on the right side or on the left side:
    1) TKAE $\in [0°; 180°]$, to a rightward rotation; and
    2) TKAE $\in ]-180°; 0°]$, to a leftward rotation.

2. The method as claimed in claim 1, wherein said capture trajectory is defined in such a way as to allow a minimum capture duration.

3. The method as claimed in claim 1, wherein the radius of the circular arc forming said initial phase is determined on the basis of a maximum allowable load factor and of a preset speed of the aircraft.

4. The method as claimed in claim 1, wherein said angle of capture exhibits a predetermined value, which is modifiable by an operator.

5. The method as claimed in claim 1, wherein, if said first conditions are not satisfied, said transition phase corresponds to a point of joining of said initial and terminal phases.

6. The method as claimed in claim 1, wherein said predetermined course corresponds to the course making it possible to follow said particular rectilinear stretch of the lateral trajectory.

7. The method as claimed in claim 1, wherein the terminal capture phase represents a circular arc rotation, whose radius is determined on the basis of a maximum allowable load factor and of a preset speed of the aircraft.

8. A procedure for guiding an aircraft which comprises a planned flight trajectory comprising at least one lateral trajectory furnished at least with a plurality of rectilinear stretches, wherein:

a) during a flight of the aircraft, when the aircraft is not guided along said planned flight trajectory, permanently:
  a1) a method such as that specified under claim 1 is implemented to automatically determine a capture trajectory allowing the aircraft to join up laterally with a particular rectilinear stretch of the lateral trajectory of said planned flight trajectory;
  a2) said capture trajectory is presented to a pilot of the aircraft;
b) when a pilot of the aircraft enables a navigation mode intended to automatically guide the aircraft laterally along said planned flight trajectory:
  b1) if the aircraft does not lie on said planned flight trajectory, the aircraft is guided automatically laterally along said capture trajectory so as to capture said planned flight trajectory; and
  b2) as soon as the aircraft lies on said planned flight trajectory, it is guided automatically with the aid of said navigation mode laterally along said planned flight trajectory.

9. The procedure as claimed in claim 8, wherein in step b1), the aircraft does not lie on the planned flight trajectory, when the lateral distance between the current position of the aircraft and the lateral trajectory of the flight trajectory is greater than a predetermined distance.

10. The procedure of claim 8, wherein the procedure is implemented by a guidance system of an aircraft.

11. The method of claim 1, wherein the method is implemented by a device of an aircraft.

12. A method for automatically determining a capture trajectory of a flight trajectory for an aircraft, said flight trajectory comprising at least one lateral trajectory furnished at least with a plurality of rectilinear stretches, said capture trajectory comprising successively an initial phase representing a circular arc rotation, a transition phase and a terminal capture phase representing a rotation, wherein:
  said capture trajectory is a lateral capture trajectory which is formed in such a way as to allow the aircraft to join up laterally with a particular rectilinear stretch of the lateral trajectory of said flight trajectory, and of which:
    the initial phase starts at the current position of the aircraft and exhibits a direction of rotation which makes it possible to minimize the duration of the capture phase, said direction of rotation depending:
      on a distance d representing the maximum distance during the initial phase with respect to said particular rectilinear stretch;
      on the radius R of the circular arc forming said initial phase;
      on an error of course, TKAE, between the current course of the aircraft and a course making it possible to follow said particular rectilinear stretch; and
      on the side, with respect to the lateral trajectory of the flight trajectory, on which the aircraft is flying, when looking in the direction of flight defined to follow said lateral trajectory;
    the transition phase comprises a rectilinear segment exhibiting an angle of capture with respect to said particular rectilinear stretch, if first conditions are satisfied; and
    the terminal capture phase represents a rotation allowing the aircraft to join up with said particular rectilinear stretch with a predetermined course, and
  said first conditions are satisfied when a distance d representing the maximum distance during the initial phase with respect to said particular rectilinear stretch satisfies one of the following relations:
    a) $d \geq 2R$, R being the radius of the circular arc forming said initial phase;
    b) $d \leq dmin$, with $dmin = 2R \cos \alpha$, $\alpha$ representing said angle of capture.

13. The method as claimed in claim 12, wherein said capture trajectory is defined in such a way as to allow a minimum capture duration.

14. The method as claimed in claim 12, wherein the radius of the circular arc forming said initial phase is determined on the basis of a maximum allowable load factor and of a preset speed of the aircraft.

15. The method as claimed in claim 12, wherein said angle of capture exhibits a predetermined value, which is modifiable by an operator.

16. The method as claimed in claim 12, wherein, if said first conditions are not satisfied, said transition phase corresponds to a point of joining of said initial and terminal phases.

17. The method as claimed in claim 12, wherein said predetermined course corresponds to the course making it possible to follow said particular rectilinear stretch of the lateral trajectory.

18. The method as claimed in claim 12, wherein the terminal capture phase represents a circular arc rotation, whose radius is determined on the basis of a maximum allowable load factor and of a preset speed of the aircraft.

19. A procedure for guiding an aircraft which comprises a planned flight trajectory comprising at least one lateral trajectory furnished at least with a plurality of rectilinear stretches, wherein:
  a) during a flight of the aircraft, when the aircraft is not guided along said planned flight trajectory, permanently:
    a1) a method such as that specified under claim 12 is implemented to automatically determine a capture trajectory allowing the aircraft to join up laterally with a particular rectilinear stretch of the lateral trajectory of said planned flight trajectory;
    a2) said capture trajectory is presented to a pilot of the aircraft;
  b) when a pilot of the aircraft enables a navigation mode intended to automatically guide the aircraft laterally along said planned flight trajectory:
    b1) if the aircraft does not lie on said planned flight trajectory, the aircraft is guided automatically laterally along said capture trajectory so as to capture said planned flight trajectory; and
    b2) as soon as the aircraft lies on said planned flight trajectory, it is guided automatically with the aid of said navigation mode laterally along said planned flight trajectory.

20. The procedure as claimed in claim 19, wherein in step b1), the aircraft does not lie on the planned flight trajectory, when the lateral distance between the current position of the aircraft and the lateral trajectory of the flight trajectory is greater than a predetermined distance.

21. The procedure of claim 19, wherein the procedure is implemented by a guidance system of an aircraft.

22. The method of claim 12, wherein the method is implemented by a device of an aircraft.

23. A device for automatically determining a capture trajectory of a flight trajectory for an aircraft, said flight trajectory comprising at least one lateral trajectory furnished at least with a plurality of rectilinear stretches, which device comprises a section for forming said capture trajectory in such a way as to obtain a trajectory which allows the aircraft to join up laterally with a particular rectilinear stretch of said flight trajectory, and which comprises, successively:
- an initial phase representing a circular arc rotation, starting at the current position of the aircraft and exhibiting a direction of rotation which makes it possible to minimize the duration of the capture phase, said direction of rotation depending:
  - on a distance d representing the maximum distance during the initial phase with respect to said particular rectilinear stretch;
  - on the radius R of the circular arc forming said initial phase;
  - on an error of course, TKAE, between the current course of the aircraft and a course making it possible to follow said particular rectilinear stretch; and
  - on the side, with respect to the lateral trajectory of the flight trajectory, on which the aircraft is flying, when looking in the direction of flight defined to follow said lateral trajectory;
- a transition phase comprising a rectilinear segment exhibiting an angle of capture with respect to said particular rectilinear stretch, if first conditions are satisfied; and
- a terminal capture phase representing a rotation allowing the aircraft to join up with said particular rectilinear stretch with a predetermined course, wherein:
- said first conditions are satisfied when a distance d representing the maximum distance during the initial phase with respect to said particular rectilinear stretch satisfies one of the following relations:
  a) $d \geq 2R$, R being the radius of the circular arc forming said initial phase;
  b) $d \leq dmin$, with $dmin = 2R \cos \alpha$, $\alpha$ representing said angle of capture.

24. A system for guiding an aircraft, comprising a guidance section that implements a navigation mode intended to automatically guide the aircraft laterally along a planned flight trajectory, wherein:

said system furthermore comprises:
- a device such as that specified under claim 23, for automatically determining a capture trajectory allowing as appropriate the aircraft to join up laterally with a particular rectilinear stretch of the lateral trajectory of said planned flight trajectory; and
- a presentation section that presents said capture trajectory to a pilot of the aircraft; and said guidance section is formed in such a way as to automatically guide the aircraft, as soon as it is enabled:
  - laterally along said capture trajectory so as to capture said planned flight trajectory, if the aircraft does not lie on said planned flight trajectory; and laterally along said planned flight trajectory with the aid of said navigation mode, as soon as said aircraft lies on said planned flight trajectory.

25. An aircraft comprising the guidance system of claim 24.

26. An aircraft comprising the device of claim 23.

* * * * *